US006646434B2

United States Patent
Miyata et al.

(10) Patent No.: US 6,646,434 B2
(45) Date of Patent: Nov. 11, 2003

(54) MAGNETIC ENCODER

(75) Inventors: Toshiharu Miyata, Sendai (JP); Kenichi Nakayama, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/268,783

(22) Filed: Oct. 11, 2002

(65) Prior Publication Data

US 2003/0080733 A1 May 1, 2003

(30) Foreign Application Priority Data

Oct. 12, 2001 (JP) .................................. 2001-315201

(51) Int. Cl.[7] ................................................ G01B 7/14
(52) U.S. Cl. ............................ 324/207.17; 324/207.24
(58) Field of Search ........................ 324/207.15, 207.16, 324/207.17, 207.24, 207.26, 260; 33/708, 784, 819, 820, 810, 811, 812; 340/870.32, 870.33, 870.36; 341/15

(56) References Cited

U.S. PATENT DOCUMENTS 5,901,458 A * 5/1999 Andermo et al. ............. 33/810
6,329,813 B1 * 12/2001 Andermo ............... 324/207.17
6,486,796 B2 * 11/2002 Miyata ................... 340/870.32
6,522,129 B2 * 2/2003 Miyata et al. ......... 324/207.17
2002/0097043 A1 7/2002 Sasaki et al. .......... 324/207.17

FOREIGN PATENT DOCUMENTS

JP A 2002-31546 1/2002

* cited by examiner

Primary Examiner—N. Le
Assistant Examiner—Reena Aurora
(74) Attorney, Agent, or Firm—Oliff & Berridge, PLC

(57) ABSTRACT

Each of first scale coils arranged at a cyclic interval $\lambda_1/2$ of a magnetic encoder is connected by each of connecting wires to a corresponding one of second scale coils arranged at a different cyclic interval $\lambda_2/2$ thereof. Each of the connecting wires includes two parallel conductors placed in such a way as to be close to each other. The connecting wires are set so that at any position on the scale, the length of the connecting wire has an equal value. Thus, the signal levels of received signals, which are attenuated by electric currents flowing through the two conductors in opposite directions, can be controlled in such a manner as to be equal to each other. Consequently, the influence of the position of a detection coil on the scale, which is exerted on the signal level of the received signal, is reduced.

4 Claims, 5 Drawing Sheets

MAGNETIC ENCODER

BACKGROUND OF THE INVENTION

1. Field of the Invention

The present invention relates to a magnetic encoder for detecting a magnetic flux, which is generated by a scale coil and cyclic changes in a measuring direction, by using a detection coil which relatively moves in the measuring direction with respect to the scale coil, and for calculating an amount of relative displacement according to increase and decrease in the detected amount of magnetic flux.

2. Description of the Related Art

An encoder for detecting an amount of relative displacement between two objects by utilizing a periodical change of a predetermined physical quantity has been known. That is, first, a cyclic change in a movement direction of the predetermined physical quantity is formed by using a scale fixed to one of the objects, which relatively move with each other. This cyclic change is detected by using a sensor fixed to the other object. Then, the number of cyclic intervals is counted to thereby calculate the amount of relative displacement between two objects.

Although the encoder can detect the amount of relative displacement between two objects, the encoder cannot detect directly the relative positions thereof. That is, this encoder can detect only relative positions thereof to be defined as amounts of displacement thereof from a reference position. Meanwhile, there has been known an absolute encoder provided with a plurality of scales respectively having different cyclic intervals and enabled to detect an absolute position of two objects within a cyclic interval, which is a least common multiple of the different cyclic intervals.

A related art magnetic encoder that is adapted to function as an absolute encoder, employs a configuration in which a plurality of first scale coils 14' arranged at predetermined cyclic intervals and a plurality of second scale coils 16' arranged at other cyclic intervals which are different from those of the first scale coils 14' are connected in a one-to-one relation by using connecting wires 18', as shown in FIG. 7. The first scale coils 14' form a sequence of magnetic fluxes at first cyclic intervals in response to signals received by the second scale coils 16'. Conversely, the second scale coils 16' form a sequence of magnetic fluxes at second cyclic intervals in response to signals received by the first scale coils 14'. Thus, electric current flows through each of the connecting wires 18' provided between the first scale coils 14' and the second scale coils 16'.

In the related art magnetic encoder having a scale of a configuration in which the first scale coils 14' and the second scale coils 16' arranged at different cyclic intervals are connected by using connecting wires 18', electric currents flowing through two conductors, which constitute each of the connecting wires 18', in opposite directions and weaken each other. Thus, the signal levels of the detected signals are degraded. Meanwhile, the first scale coils 14' and the second scale coils 16' are arranged at different cyclic intervals. Therefore, for example, as shown in FIG. 7, when each of the connecting wires 18' connects between a center of a side of each first scale coil 14' and a center of a side of a corresponding one of the second scale coils 16', the side of the first scale coil 14' and the side of the second scale coil 16' being opposite to each other, the length of the connecting wires varies with the position on the scale. In the case that the length of the connecting wires varies therewith, the degree of degradation in the signal level of the detected signal also varies therewith. Thus, the relative art magnetic encoder has a problem in that the signal level of the received signal changes with the position of the detection coil on the scale.

SUMMARY OF THE INVENTION

The invention is accomplished to solve the aforementioned problem. Accordingly, an object of the invention is to provide a magnetic encoder enabled to reduce change in the signal level of a received signal, which depends upon the position of a detection coil on a scale.

To solve the foregoing object, according to the invention, there is provided a magnetic encoder adapted so that a plurality of connecting wires, which connect a plurality of first scale coils arranged in the measuring direction at first cyclic intervals and a plurality of second scale coils arranged in the measuring direction at second cyclic intervals, which are other than integral multiples of the first cyclic interval have a nearly equal length. Thus the signal level of the reduced signal is uniformed among the connecting wires. Consequently, change in the signal level, which depends on the position of the detection coil on the scale, can be reduced.

Further, preferably, a direction, in which the connecting wires extend, is nearly perpendicular to the measuring direction. Thus, the length of the wires can be decreased. Consequently, the reduction in the signal level can be decreased.

Moreover, preferably, the cyclic intervals, at which the connecting wires are arranged in the measuring direction, are set to be constant. Thus, the finding of the influence of the magnetic flux caused by the connecting wires can be facilitated.

DETAILED DESCRIPTION OF THE INVENTION

Figure 1:
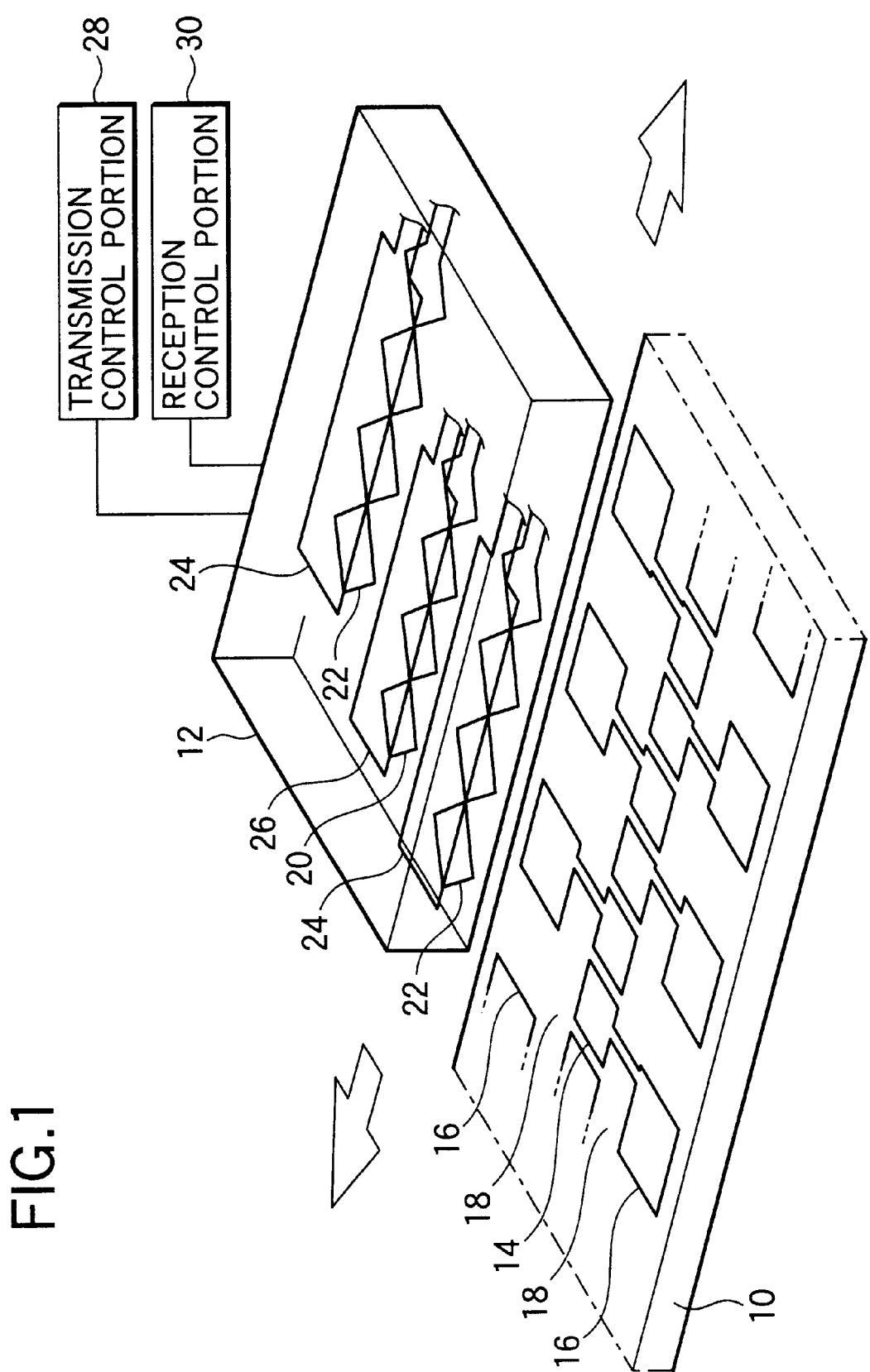
FIG. 1 is a view illustrating the outline configuration of a magnetic encoder that is an embodiment of the invention.

Hereinafter, a mode for carrying out the invention is described with reference to the accompanying drawings. FIG. 1 illustrates the outline configuration of this embodiment of the invention. In this embodiment, a scale 10 extending in a measuring direction indicated by an arrow shown in this figure and a slider 12, which is formed in such a way as to be integral with an object to be measured or as to have a predetermined relation with the object to be measured and as to be able to move in the measuring direction, are disposed. The amount of displacement of or the position of the object to be measured is detected by sensing the amount of relative displacement of or the relative position of each of the scale 10 and the slider 12. A wiring pattern iterated in the measuring direction according to a predetermined rule is formed on the scale 10. The wiring pattern includes a plurality of first scale coils 14, a plurality of second scale coils 16, and a plurality of connecting wires 18. The first scale coils 14 are arranged in a line in the measuring direction at a cyclic interval $\lambda_1/2$. The second scale coils 16 are arranged on both sides of a sequence of the first scale coils 14 in a line in the measuring direction at acyclic interval $\lambda_2$. Each of the connecting wires 18 connects each of the first scale coils 14 and a corresponding one of second scale coils 16. On the other hand, a wiring pattern is formed on the slider 12. A first detection coil 20 is disposed at a place corresponding to the first scale coil 14, while a second detection coil 22 is disposed at a place corresponding to the second scale coil 16. Moreover, on the slider 12, a first excitation coil 24 is disposed at a place corresponding to the second scale coil 16, while a second excitation coil 26 is disposed at a place corresponding to the first scale coil 14.

Electric current having a predetermined frequency is supplied from a transmission control portion 28 to the first and second excitation coils 24 and 26, respectively. Owing to this current, an induction current is generated in each of the scale coils 14 and 16. Further, a magnetic field due to this induction current is received by the detection coils 20 and 22. A reception control portion 30 calculates an amount of displacement of and the position of the slider 12 according to the strength of the magnetic field detected by the detection coils 20 and 22.

Figure 2:
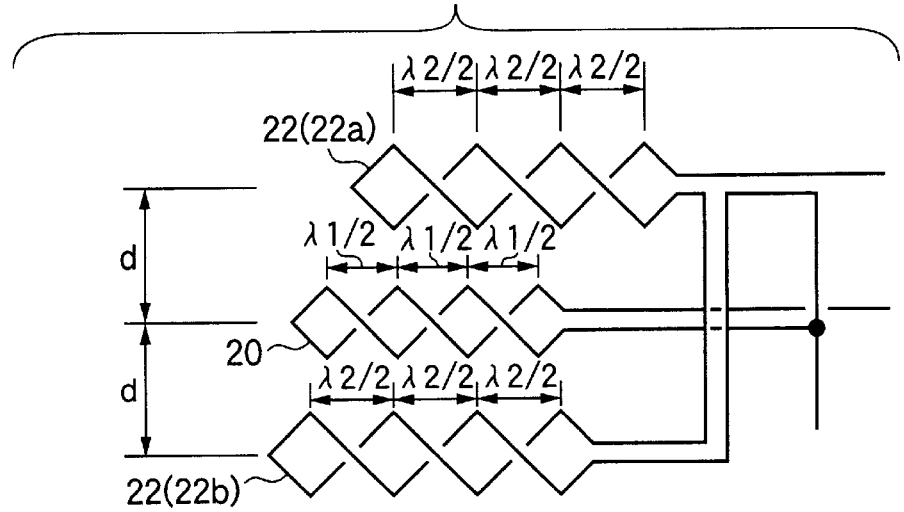
FIG. 2 is a view illustrating the shape of a coil.
Figure 2:
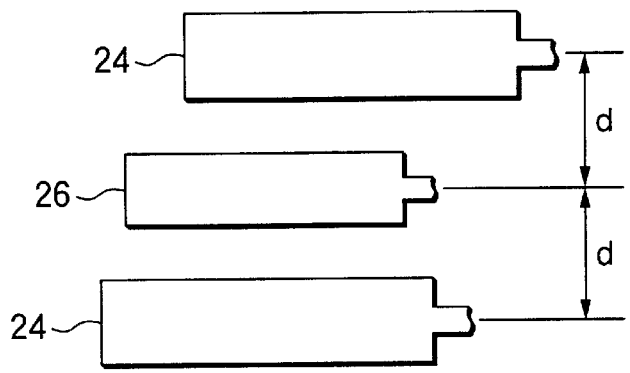
Figure 2:
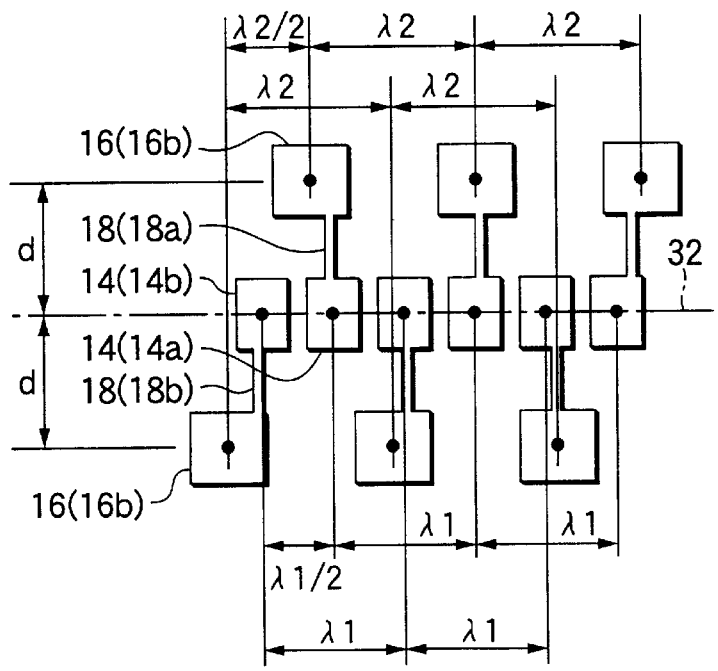

FIG. 2 shows the details of a wiring pattern. As described above, the first scale coils 14 are arranged in a line in the measuring direction at equal cyclic intervals, each of which is $\lambda_1/2$. Two lines of second scale coils 16 are arranged along both sides of an axis 32 of a sequence of the first scale coils 14, respectively, in such a manner that a distance between each of lines and the axis 32 becomes d. In the following description, when it is necessary for discriminating between the two sequences of the second scale coils 16, reference character 16a designates the upper sequence of the second scale coils 16, and reference character 16b denotes the lower sequence of the second scale coils 16, as viewed in FIG. 2. In each of the sequences, the second scale coils 16 are arranged at equal cyclic intervals, each of which is $\lambda_2$. The second scale coils 16a of one of the sequences are arranged by being shifted from the second scale coils 16b of the other sequence by the cyclic interval $\lambda_2/2$.

The first scale coils 14 are connected to the second scale coils 16 in a one-to-one relation by using the connecting wires 18. As illustrated in this figure, the first scale coils 14 are alternately connected to the second scale coils 16 of one of the sequences and to the second scale coils 16 of the other sequence. In the following description, when it is necessary to classify the first scale coils 14 into two groups according to which of the two sequences the second scale coil 16 to be connected to each of the first scale coils 14 belongs to, reference character 14a designates the group of the first scale coils 14 to be connected to the second scale coils 16a, while reference character 14b denotes the group of the first scale coils 14 to be connected to the second scale coils 16b. In the case illustrated in FIG. 2, the odd-numbered first scale coils 14b from the left are connected to the second scale coils 16b, as viewed in this figure. Further, the even-numbered first scale coils 14a from the left are connected to the second scale coils 16a, as viewed in this figure. Furthermore, the first scale coils of each of the groups 14a and 14b are arranged at the cyclic interval of $\lambda_1$. Further, although the values $\lambda_1$ and $\lambda_2$ of the cyclic interval are close to each other, these values are unequal to each other.

The connecting wires 18 include wires 18a, which are used for connecting the first scale coils 14a to the second scale coils 16a, and wires 18b used for connecting the first scale coils 14b to the second scale coils 16b. The connecting wires of each of groups 18a and 18b are arranged at predetermined cycle intervals. Further, the connecting wires 18a are arranged by being respectively shifted from the connecting wires 18b by a half of cyclic interval.

Each of the first excitation coils 24 and the second excitation coil 26 of the slider 12 has a nearly rectangular shape. The first excitation coils 24 are arranged in such a way as to respectively face the second scale coils 16a and 16b. The rectangle, which is the shape of each of the excitation coils 24, has a length of approximately $2\lambda_2$ in the measuring direction. The second excitation coil 26 is arranged in such a manner as to face the first scale coil 14. The rectangle, which is the shape of each of the excitation coils 26, has a length of almost $2\lambda_1$ in the measuring direction. The first and second excitation coils 24 and 26 are individually supplied with electric power from the transmission control portion 28. Thus, electric currents are induced in the first and second scale coils 14 and 16.

The first detection coil 20 and the second detection coils 22 of the slider 12 are arranged at places at which each of these coils overlaps with a corresponding second excitation coil 26 and the first excitation coils 24. However, electrical insulation thereof is maintained. The first detection coil 20 is shaped like a series of four lozenges or squares. Parts of the wire, which appear to intersect with one another, are actually separated from one another in a direction perpendicular to the plane of a sheet of paper, on which this figure is drawn, so that the insulation of the parts of the wire is maintained The four lozenges are arranged in the measuring direction at the cyclic intervals, each of which has a value of $\lambda_1/2$. The two second detection coils 22 are placed correspondingly to the first excitation coils 24. Moreover, similarly as the first detection coil 20, each of the second detection coils 22 is shaped like a series of four lozenges or squares. Furthermore, similarly as the aforementioned parts of the wire of the first detection coil 20, parts of the wire of each second detection coil 22, which appear to intersect with one another as shown in this figure, are insulated from each other. The cyclic interval of the sequence of the lozenges of the second detection coils 22 has a value of $\lambda_2/2$. As described above, the magnetic fields generated owing to electric currents flowing through the first scale coil 14 and the second scale coils 16 cause electric currents to flow through the first detection coil 20 and the second detection coils 22. The position of and the amount of displacement of the slider 12 are measured by detecting such electric currents flowing through the detection coils 20 and 22 with the reception control portion 30 and by measuring the strength of each of these currents and the change in the strength thereof. Incidentally, the shape of each of the first and second detection coils 20 and 22 is not limited to the series of four lozenges or squares and may be one of similar shapes, such as a shape obtained by superimposing the figures of sinusoidal waves, whose phases are opposite, or as a series of circles. Although the shape obtained as a series of lozenges is advantageous in easiness of manufacturing, the shape obtained by superimposing the figures of the sinusoidal waves is preferable by taking account of the waveform detected by the coil, so that higher detection accuracy can be realized.

Figure 3:
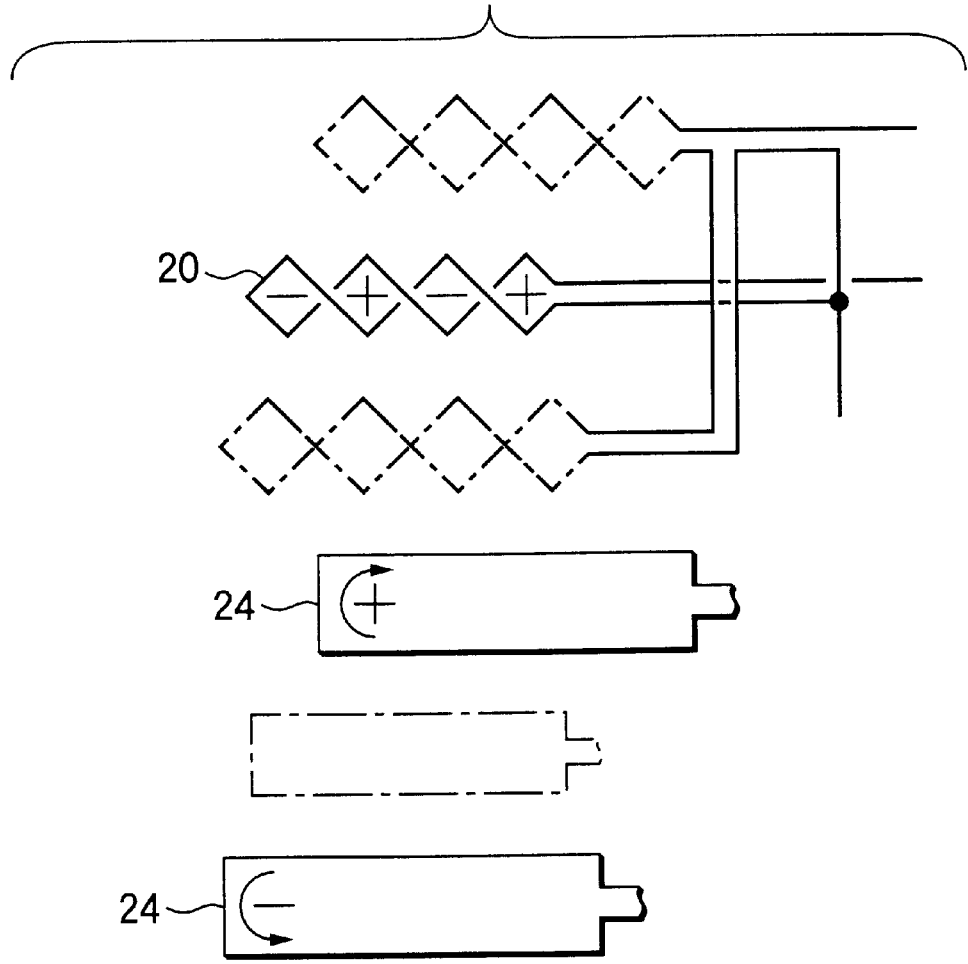
FIG. 3 is a view illustrating a measurement concerning to a wavelength $\lambda_1$.
Figure 3:
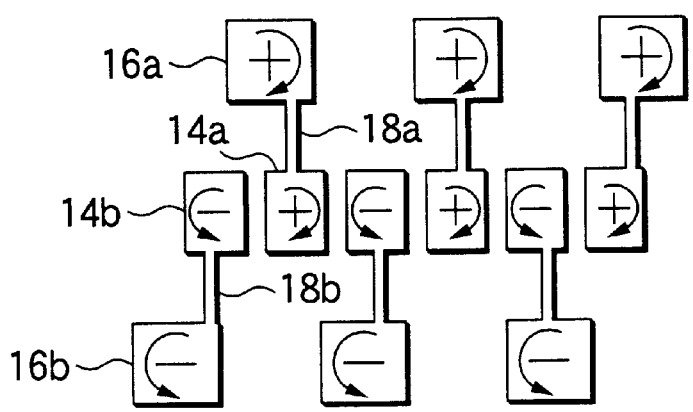
Figure 4:
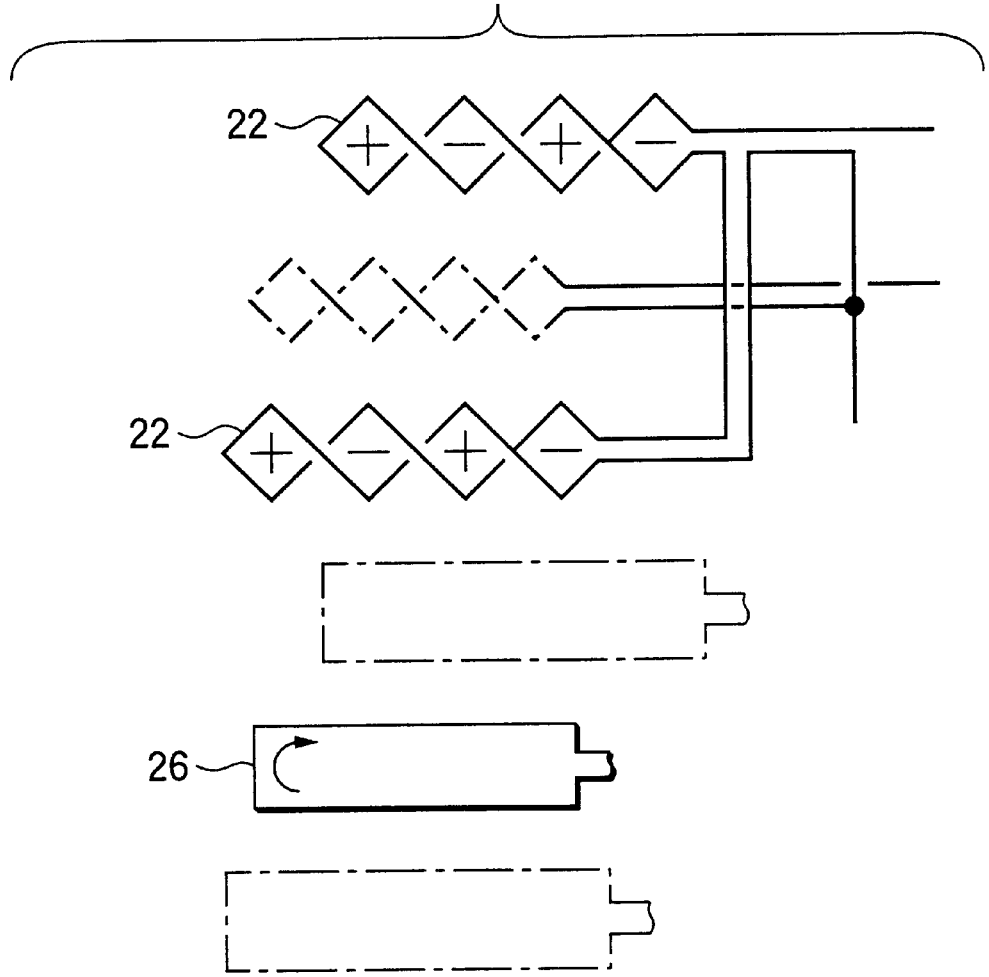
FIG. 4 is a view illustrating a measurement concerning to a wavelength $\lambda_2$.
Figure 4:
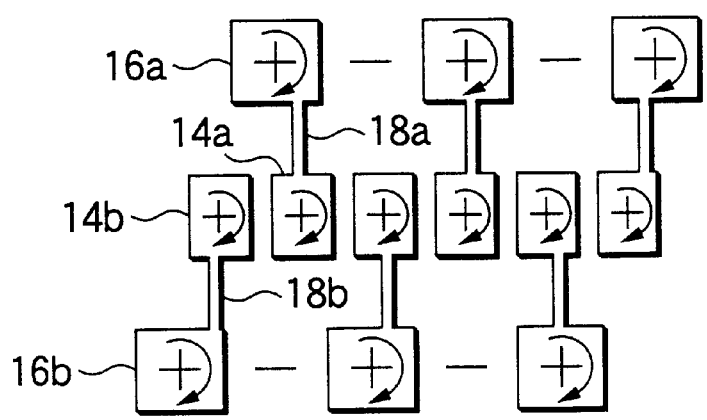

FIGS. 3 and 4 illustrate the measurement principle of the magnetic encoder according to this embodiment. FIG. 3 is a view illustrating a measurement performed by using the first excitation coils 24 and the first detection coil 20. As illustrated in this figure, electric currents in the opposite phases are supplied to the two first excitation coils 24. Thus, electric currents flow through the second scale coils 16a and 16b in the opposite direction. These currents flow through the first scale coils 14a and 14b connected by the connecting wires 18a and 18b, so that opposite magnetic fields alternately arranged in the measuring direction are formed. These magnetic fields induct electric currents, which flow in the opposite directions as viewed in the figure, in the four lozenged parts of the first detection coil 20. These electric currents are added up by a portion of the aforementioned configuration having the lozenged parts. The strength of each of these electric currents changes according to the relative position in the measuring direction of the first scale coils 14 and the first detection coil 20. That is, when the center of each of the lozenged parts of the first detection coil 20 coincides with the center of each of the first scale coils 14, the strength thereof has a maximum or minimum value values between the maximum value and the minimum value correspond to the phases of the coils. The electric current value changes nearly like a sinusoidal wave having a wavelength of $\lambda_1$.

FIG. 4 is a view illustrating a measurement performed by using the second excitation coil 26 and the second detection coils 22. Electric current is supplied to the second excitation coil 26, as illustrated in this figure. Thus, electric currents flow through the first scale coils 14a and 14b in the same direction, respectively. Such currents flow through the second scale coils 16a and 16b connected by the connecting wires 18a and 18b. This results in formation of magnetic fields in the same direction. A magnetic field, whose direction is opposite to the direction of the magnetic fields formed within the coils 16a and 16b adjoining in the measuring direction, is formed in a part between the second scale coils 16a and 16b. These magnetic fields induce electric currents, which alternately flow in opposite directions, in the four lozenged parts of the second detection coils 22, as viewed in this figure. These currents are added up by a portion of the aforementioned configuration having the lozenged parts. The strength of each of these electric currents changes according to the relative position in the measuring direction of each of the second scale coils 16 and the second detection coil 22. That is, when the center of each of the lozenged parts of the second detection coil 22 coincides with the center of each of the second scale coils 16, the strength thereof has a maximum or minimum value values between the maximum value and the minimum value correspond to the phases of the coils. The electric current value changes nearly like a sinusoidal wave having a wavelength of $\lambda_2$.

Thus, two sinusoidal signals having wavelengths $\lambda_1$ and $\lambda_2$, which are close to each other and differ from each other, can be obtained in response to the relative displacement of the scale 10. The relation between the phases of the two sinusoidal signals is expressed by a periodic function employing a least common multiple $\Lambda$ of the values $\lambda_1$ and $\lambda_2$ as a single wavelength. In other words, within a range of the wavelength $\Lambda$, the absolute position of the scale 10 can be uniquely determined. In the case of measurement of the amount of displacement and the position thereof, whose values are larger than $\Lambda$, this embodiment stores the amount of displacement thereof every time the scale 10 is displaced by an amount that is equal to the single wavelength $\Lambda$. Further, when an amount of displacement thereof is less than the single wavelength $\Lambda$, such an amount of displacement thereof is calculated from the phase relation between the two sinusoidal signals, as described above. A total amount of displacement of the scale 10 is calculated by adding up these amounts of displacement thereof.

Figure 7:
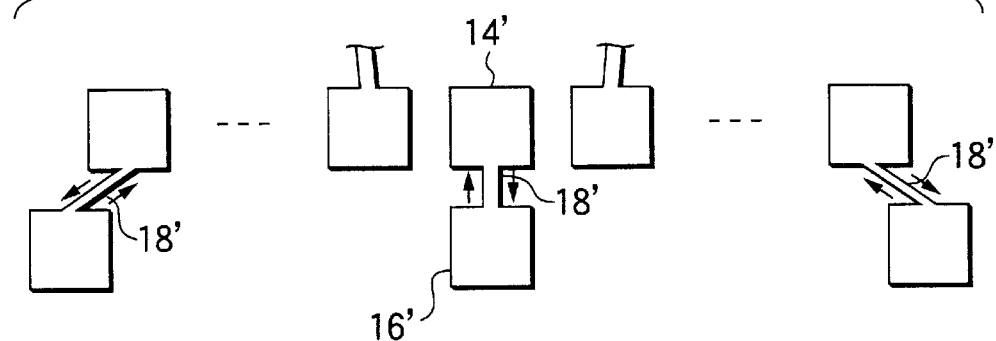
FIG. 7 is a view illustrating an example of a manner in which the length of connecting wires changes on the position thereof on a scale, in the related art.

As illustrated in FIGS. 3 and 4, the connecting wires 18 constitute a loop together with the first scale coil 14 and the second scale coil 16, to which each of the connecting wires 18 is connected. Two conductors are placed side by side in close proximity to each other as the connecting wires 18. In these two conductors, electric currents respectively flow in opposite directions and cause magnetic fields, each of which induces an electric current that flows through the conductor other than the corresponding conductor in a direction opposite to the direction in which the other electric current flowing in the corresponding conductor. Consequently, the signal levels of signals detected by the detection coils 20 and 22 are reduced. The sequence of the first scale coils 14, and the sequence of the second scale coils 16 are respectively arranged at the cyclic intervals $\lambda_1/2$ and $\lambda_2/2$, which differ from each other (see FIG. 2). Therefore, when the connecting wires 18 are placed in such a way as to simply connect the centers of the two coils 14 and 16, such connecting wires 18 are placed like connecting wires 18' shown in FIG. 7. As illustrated in this figure, the connecting wires 18' at an end portion of the scale 10 are provided in such a manner as to obliquely extend and have length that differs from the length of the connecting wires 18' extending in a direction perpendicular to the measuring direction at the middle portion of the scale 10. In the case that the length of the connecting wires 18' increases, the degree of reduction in the signal level of the received signal increases. That is, in the case illustrated in FIG. 7, the closer to the end portion of the scale the detection coils are placed, the lower the signal level of the received signal becomes. Owing to this lowering of the level, the phase of the received signal having the sinusoidal waveform cannot be accurately calculated. This results in degradation of the measuring accuracy of this encoder.

Figure 5:
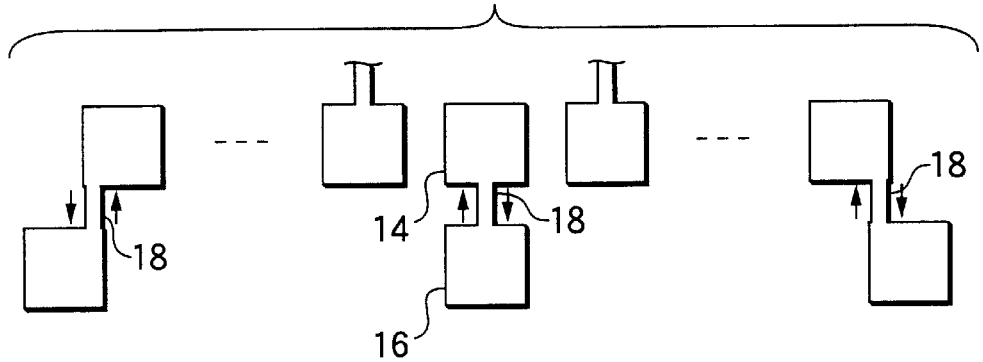
FIG. 5 is a view illustrating a primary part of this embodiment of the invention, which shows an example of the manner in which the length of connecting wires is equal on the position thereof on a scale.

FIG. 5 is a view illustrating the connecting wires 18 equalized in length. At any position on the scale, the length of the connecting wires 18 is constant. Thus, the lowering of the signal level of the received signal does not depend upon the position of each of the detection coils on the scale. Consequently, the measuring accuracy of the encoder can be enhanced.

Furthermore, the connecting wires 18 are disposed in such a way as to extend in a direction perpendicular to the measuring direction, that is, the direction in which the sequences of the first scale coils 14 and the second scale coils 16 are arranged. Thus, the length of each of the connecting wires 18 can be shortened. Moreover, the connecting wires 18 themselves are arranged at the constant cyclic intervals. With such an arrangement, when noises having a certain cycle are detected, it can be easily determined by comparison between this cycle of the noises and the cyclic interval of the connecting wires whether or not the cause of the noise is the connecting wires.

Figure 6:
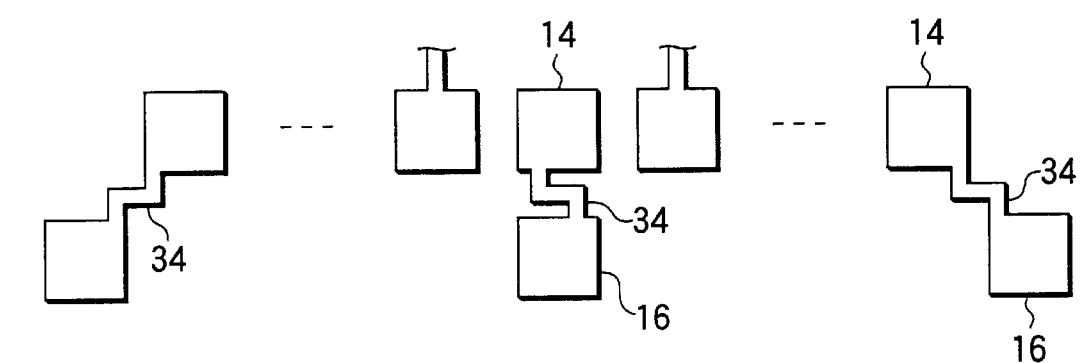
FIG. 6 is a view illustrating a primary part of this embodiment of the invention, which shows another example of the manner in which the length of connecting wires is equal on the position thereof on a scale.

FIG. 6 shows an example of the shape of the configuration of the connecting wires, which is employed in the case that the first scale coils 14 and the second scale coils 16 seriously loose their shapes at a place near to an end portion of the scale, and that the linear connecting wires 18 as shown in FIG. 5 cannot be used there at. As illustrated in FIG. 6, each of connecting wires 34 is shaped like a crank. The connecting wires 34 are equal in length. Therefore, the reduction in the signal level of the received signal is not affected by the position of the detection coils on the scale.

As described above, by equalizing the lengths of the connecting wires, the signal level of the received signal can be prevented the length of the connecting wires from changing according to the position of each of the detection coils on the scale.

What is claimed is:

1. A magnetic encoder comprising:

a plurality of scale coils arranged in a measuring direction in a predetermined pattern, the scale coils having a plurality of first scale coils arranged in the measuring direction at first cyclic intervals, a plurality of second scale coils arranged in the measuring direction at second cyclic intervals that are other than integral multiples of the first cyclic interval, and a plurality of connecting wires, each of which has two conductors placed side by side in close proximity to each other, and connects each of said first scale coils and a corresponding one of second scale coils so as to form one loop together with said first scale coil and said second scale coil;

an excitation coil for exciting said scale coils;

a detection coil, disposed in such a way as to be able to move in the measuring direction with respect to said scale coils, for detecting a magnetic flux caused by said excited scale coils; and a computing portion for calculating an amount of relative displacement of said scale coils and said detection coil from change in the detected magnetic flux, wherein said connecting wires have a nearly equal length.

2. The magnetic encoder according to claim 1, wherein a direction, in which said connecting wires extend, is nearly perpendicular to the measuring direction.

3. The magnetic encoder according to claim 1, wherein said connecting wires are arranged in the measuring direction at constant cyclic intervals.

4. The magnetic encoder according to claim 1, wherein said connecting wire is shaped like a crank.

* * * * *